United States Patent [19]

Ready

[11] Patent Number: 4,743,439

[45] Date of Patent: May 10, 1988

[54] WET CALCINATION OF ALKALI METAL BICARBONATES IN HYDROPHOBIC MEDIA

[75] Inventor: Douglas F. Ready, Hopatcong, N.J.

[73] Assignee: General Chemical Corporation, Parsippany, N.J.

[21] Appl. No.: 571,325

[22] Filed: Jan. 16, 1984

[51] Int. Cl.⁴ .................. C01D 15/08; C01D 17/00; C01D 7/37
[52] U.S. Cl. ............................ 423/421; 423/427; 423/206 T; 423/DIG. 7; 23/302 T
[58] Field of Search ........... 423/186, 189, 190, 206 T, 423/421, 422, 423, 424, 429, 427, DIG. 7; 23/295 S, 298, 302 T

[56] References Cited

U.S. PATENT DOCUMENTS

| | | | |
|---|---|---|---|
| 2,671,713 | 3/1954 | Miller et al. | 423/423 |
| 3,246,962 | 4/1966 | Miller | 423/206 T |
| 3,264,057 | 8/1966 | Miller | 423/206 T |
| 3,700,280 | 10/1972 | Popadopoulos et al. | 423/206 T |
| 3,779,601 | 12/1973 | Beard | 423/206 T |
| 4,252,781 | 2/1981 | Fujita et al. | 423/195 |

Primary Examiner—Gary P. Straub
Attorney, Agent, or Firm—Arthur J. Plantamura; Richard C. Stewart, II

[57] ABSTRACT

A process for the wet calcination of sodium bicarbonate, sodium sesquicarbonate or mixtures thereof comprising forming a suspension of sodium bicarbonate, sodium sesquicarbonate or said mixture in a water-immiscible relative high boiling liquid, and heating the suspension to form sodium carbonate.

19 Claims, 1 Drawing Sheet

WET CALCINATION OF ALKALI METAL BICARBONATES IN HYDROPHOBIC MEDIA

BACKGROUND OF THE INVENTION

1. Field of the Invention:

This invention relates to a process for the preparation of sodium carbonate. More particularly this invention relates to a process for the preparation of sodium carbonate through wet calcination of a solid material containing sodium bicarbonate, sodium sesquicarbonate or a mixture thereof by direct contact with a hot, water-immiscible liquid, thereby liberating carbon dioxide and water and converting the sodium bicarbonate and sodium sesquicarbonate to sodium carbonate.

2. Prior Art:

Sodium carbonate, immensely consumed in many industries, is obtained mostly by the pyrolysis of sodium bicarbonate or sodium sesquicarbonate prepared by the ammonia soda process or ammonium chloride soda process. In the ammonia soda process, carbon dioxide gas is passed through ammonia-saturated salt-water to precipitate sodium bicarbonate, followed by separation of the precipitate and washing. This crude sodium bicarbonate is calcined to give sodium carbonate as represented by the following equation:

$$2NaHCO_3 + heat \rightarrow Na_2CO_3 + CO_2 \uparrow + H_2O$$

Conventional dry calcination procedures suffer from a number of inherent disadvantages. For example, presently practiced methods for debicarbonation of sodium bicarbonate and sodium sesquicarbonate are based on dry calcination in fired or steam heated calciners and require substantially more thermal energy than the thermodynamic minimum for the reaction. Most of the energy consumed in these processes is not converted into useful work of the chemical transformation, but rather is dissipated as the essentially unrecoverable heat content of the gases leaving the calciner. Equipment limitations effectively preclude operation of these calciners at elevated pressures which would facilitate recovery of energy in a useful form, as for example steam, from the hot gases.

Wet calcination schemes have been proposed for the conversion of sodium bicarbonate, sodium sesquicarbonate and mixtures thereof into sodium carbonate which employ an aqueous liquor as the suspending and heat transfer medium. Illustrative of such wet calcination processes is the process described in U.S. Pat. No. 4,252,781. In the wet calcination process of that patent, a thick suspension of sodium carbonate anhydride is obtained by contacting high pressure steam and a suspension of sodium bicarbonate or sodium sesquicarbonate in a concentrated solution of sodium carbonate in a counter current fashion. The decomposition reaction is pushed almost to completion by maintaining the reaction temperature above 150° C. which increases the concentration of bicarbonate ions in the solution. The sodium carbonate anhydride suspension is cooled which converts the sodium carbonate anhydride into sodium carbonate monohydrate. The crystalline monohydrate is separated from the mother liquor. The mother liquor is recycled for the preparation of the sodium bicarbonate or sodium sesquicarbonate suspension. The sodium carbonate monohydrate is calcined to provide dense soda ash of high purity and of substantially uniform particle size.

This known wet calcination process suffers from a number of inherent disadvantages. For example, aqueous bicarbonate and sesquicarbonate liquors are quite corrosive to carbon steel at elevated temperatures e.g., 100° C. to 200° C. This necessitates the use of costly corrosion resistant alloys in the fabrication of process equipment which contact these corrosive aqueous process streams. A further disadvantage of this prior art wet process results from the use of countercalcination current columns for debicarbonation of the sodium bicarbonate or sesquicarbonate. In order for such columns to function successfully, suspended solids must be in a finely ground state. This requirement greatly increases process cost and expense in that feed material originating from trona mining operations are usually coarse solids, and therefore must be processed further before use in the prior art process. Still another disadvantage of this prior art aqueous calcination process is that the process requires substantial residence time and a number of stages to effect reasonably complete decomposition of the sodium bicarbonate and sodium sesquicarbonate. This is apparently the result of thermodynamic equilibrium and kinetic limitations associated with the presence of an aqueous phase.

SUMMARY OF THE INVENTION

In accordance with this invention, there is provided a novel wet calcination process for converting sodium bicarbonate, sodium sesquicarbonate and mixtures thereof into sodium carbonate. The process of this invention comprises the steps of: on of sodium bicarbonate, (a) preparing a suspension of sodium bicarbonate, sodium sesquicarbonate or mixtures thereof in one or more water-immiscible carrier liquids; and (b) heating said suspension for a time and at a temperature sufficient to promote conversion of said sodium bicarbonate, sodium sesquicarbonate or mixture into sodium carbonate.

The process of this invention obviates many of the defects of prior art dry and wet calcination processes. For example, use of the process of this invention provides for a reduction in high energy consumption associated with dry calcination of sodium bicarbonate and sesquicarbonate materials. A further advantage of the process of this invention as compared to known processes is that by operating at elevated pressure, the present process allows for the recovery of energy in the form of low pressure steam by heat exchange with gases liberated during calcination. Yet another advantage of the process of this invention is that the use of the water immiscible carrier liquid in a closed circuit facilitates exchange of heat between the process streams and compact heat exchangers, while at the same time allowing the use of relatively inexpensive carbon steel equipment through avoidance of a corrosive aqueous liquid phase. Still another advantage of the process of this invention is that it produces a byproduct carbon dioxide stream of sufficient purity to justify recovery of the carbon dioxide.

DESCRIPTION OF THE PREFERRED EMBODIMENTS

Figure 1:
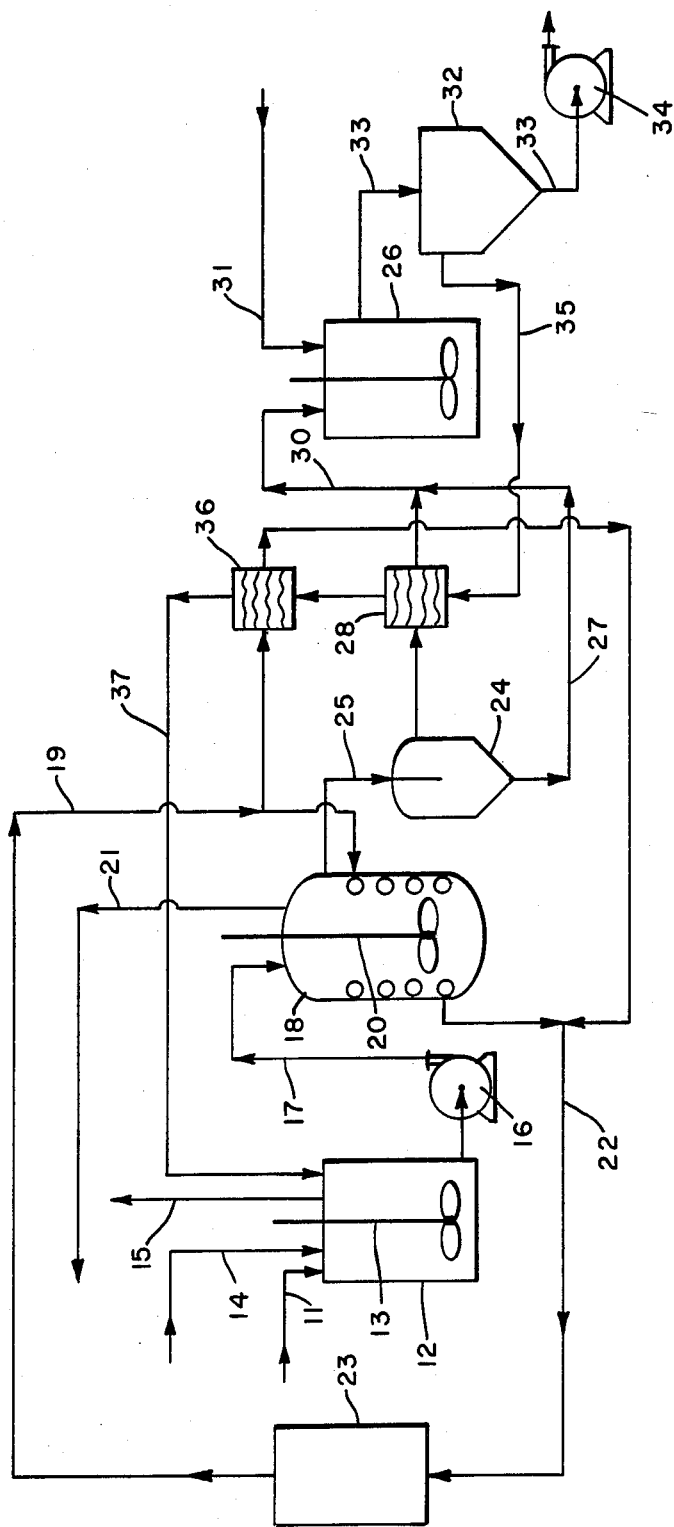
FIG. 1 is a flow diagram illustrating one embodiment of the process of this invention.

The process of this invention comprises two essential steps. In the first essential step of the process of this invention, a suspension of "sodium bicarbonate" in a water-immiscible carrier liquid is formed. In the present application, the term "sodium bicarbonate" means not only sodium bicarbonate but also sodium sesquicarbonate and a mixed phase of these two substances. The type of sodium bicarbonate employed is not critical, and any of the aforementioned materials can be used as the sodium bicarbonate in the process of this invention. However, in the preferred embodiments of the invention, the sodium bicarbonate of choice is naturally occurring trona which is chemically sodium sesquicarbonate.

The sodium bicarbonate is used in a particulate form. In general, the finer the particles of sodium bicarbonate, the more effective the conversion process in the heating step; and conversely, the coarser the particles of sodium bicarbonate the less effective the conversion process in the heating step. The average size of the sodium bicarbonate particles is usually about 4 mesh or less. In the preferred embodiments of the invention, sodium bicarbonate average particle size is about 10 mesh or less, and in the particularly preferred embodiments of the invention is from about 10 to about 200 mesh. Amongst these particularly preferred embodiments, most preferred are those embodiments in which the average particle size of the sodium bicarbonate particles in the suspension are from about 50 to about 100 mesh.

The second component of the suspension is a "water immiscible carrier liquid". As used herein, a "water-immiscible carrier liquid" is any organic or inorganic liquid which is inert and in the liquid state under the process conditions, and has a solubility in water of less than about 0.1 gms per ml, and preferably less than about 0.001 gms per ml at 25° C. Illustrative of useful water-immiscible carrier liquids are organic liquids such as high boiling point hydrocarbons as for example kerosenes, naphthas, parafins, isoparafins, high boiling aromatic and polyaromatic materials; silane and siloxane compounds; and mineral oils. Exemplary of other useful water-immiscible carrier liquids are inorganic materials such as molten metals and alloys, and various silicon based liquids which do not contain carbon and hydrogen. Preferred for use in the practice of this invention as the water-immiscible carrier liquid are high boiling organic materials which are liquid over a temperature range of from about 40° C. to about 200° C. at 1 atmosphere, and particularly preferred for use in the conduct of the process of this invention are such organic materials which are liquid over a temperature range of from about 150° C. to about 200° C. at 1 atmosphere. Amongst these particularly preferred embodiments, most preferred are those embodiments of the invention in which the water-immiscible carrier liquid is selected from the group consisting of parafins, aromatic oils and polyaromatic oils. Illustrative of these most preferred water-immiscible carrier liquid are "Mobiltherm 600" which is manufactured and sold by Mobil Oil Company, "Caloria 43" which is manufactured and sold by Exxon Corporation, and "Dow therm HT" which is manufactured and sold by Dow Chemical Company.

The method of forming the slurry is not critical and any slurrying method known to those of skill in the art can be used. For example, in one preferred embodiment crushed trona ore is screened to remove oversize material and then introduced, through a rotary airlock, into a closed, agitated vessel wherein it is mixed with and suspended in the preheated water immiscible carrier liquid.

The amount of water-immiscible carrier liquid should be sufficient to at least wet the sodium bicarbonate particles. In the preferred embodiments of the invention, the amount of water-immiscible carrier liquid is sufficient to form a slurry consisting of two distinct phases, the liquid water-immiscible carrier liquid phase and the solid sodium bicarbonate phase. In the particularly preferred embodiments of the invention the amount of the water-immiscible carrier liquid is sufficient to form a continuous liquid phase in which the particles of sodium bicarbonate are suspended.

In the second essential step of the process of this invention, the sodium bicarbonate/water immiscible carrier liquid slurry is heated for a time and at a temperature sufficient to promote the conversion of all or a part of the sodium bicarbonate into sodium carbonate. In the preferred embodiments of this invention, the mixture of sodium bicarbonate and water immiscible liquid carrier is heated to a temperature of at least about 40° C., and in the particularly preferred embodiments of this invention the mixture is heated to a temperature of from about 120° C. to about 300° C. Amongst these particularly preferred embodiments, most preferred are those embodiments in which the mixture is heated to a temperature of from about 150° C. to about 200° C.

The mixture of sodium bicarbonate and water-immiscible carrier liquid is heated for a time sufficient to convert all or a portion of the sodium bicarbonate in the mixture into sodium carbonate. There is an indirect relationship between residence times and the heating temperature. The higher the temperature of the mixture during the heating step, the shorter the residence times required to achieve a fixed percent conversion of the sodium bicarbonate in the mixture into sodium carbonate; and conversely, the lower the temperature of the mixture during the heating step longer the residence times required to achieve a fixed percent conversion of the sodium bicarbonate in the mixture into sodium carbonate. In general, residence times may vary from about 1 or 2 seconds up to about twenty four hours or more. In the preferred embodiments of this invention employing preferred process temperatures, residence times may vary from about 1 minute to about 5 hours; and in the particularly preferred embodiments of this invention employing particularly preferred process temperatures, residence times may vary from about 5 minutes to about 2 hours. Amongst there particularly preferred embodiments, most preferred are those embodiments of the invention employing most preferred process temperatures where residence times are from about 10 minutes to about 30 minutes.

Pressures employed during the heating step can vary widely, and sub-atmospheric, atmospheric and super-atmospheric pressures can be employed. In the preferred embodiments of this invention, the heating step is conducted at super-atmospheric pressures, and in the particularly preferred embodiments of this invention the heating step is conducted at a pressure below that at which an aqueous liquid phase can exist in equilibrium with evolving gases. Amongst these particularly preferred embodiments, most preferred are those embodiments in which the heating step is carried out at a pressure of from about 90 to about 160 psig.

The hot water and/or steam, and carbon dioxide evolved during the heating step can be separated from the mixture of the product sodium carbonate and water-immiscible liquid carrier employing conventional means. The separated steam/carbon dioxide mixture can be fed to a cooling apparatus containing a heat exchanger where the steam can be condensed and the heat of condensation used to heat the mixture of sodium bicarbonate and water immiscible liquid carrier in the heating step. The hot slurry of the sodium carbonate product and the water immiscible liquid carrier can be cooled and water or dilute aqueous sodium carbonate solution added to the slurry dissolving the sodium carbonate product. The aqueous sodium carbonate solution can be separated from the mixture using conventional means, as for example decantation. Sodium carbonate monohydrate can be isolated from the aqueous sodium carbonate solution by crystallization, and converted into anhydrous sodium carbonate using conventional process technology, as for example the process technology described in U.S. Pat. Nos. 2,770,542; 3,084,026; and 2,792,292. The water immiscible carrier liquid can be recycled as described above.

The following specific example is present to more particularly illustrate the invention.

EXAMPLE I

As shown in FIG. 1, warm (100° C.) water immiscible carrier liquid, such as a high boiling aromatic or polyaromatic oil, is fed continuously or batchwise via line 11 into mixer 12. Trona ore in a particulate form, i.e. average particle size of from about 10 to about 200 mesh, is fed continuously or batchwise into mixer 12 via line 14 where it is suspended in the warm carrier liquid. Mixer 12 is fitted with some mixing means as for example a stirrer 13. In mixer 12 most of the surface moisture associated with the trona ore is vaporized and is vented via line 15. Sufficient vapor is generated to sweep away most of the air which is introduced with the ore or carrier liquid feed. The trona ore/carrier liquid slurry is pumped by pump 16 via line 17 to reactor 18. In reactor 18, the trona ore/carrier liquid slurry is heated to and maintained at a temperature sufficiently high to promote rapid decomposition of the trona ore (from about 150° C. to about 200° C.) by steam introduced into reactor 18 by way of line 19. The intimate contact between the carrier liquid and suspended trona ore promotes rapid and efficient heat transfer aided by the turbulence produced by mechanical agitation by way of stirrer 20 and by the water and carbon dioxide vapors evolving from the decomposing trona ore. Pressure in reactor 18 is preferably maintained below that at which an aqueous liquid phase can exist in equilibrium with the evolving vapors, typically from about 100 to about 150 psig. One or more additional reactors can be placed in series or in parallel with reactor 18 to provide for increased capacity or to ensure a reasonably approach to plug flow residence time distribution and minimized discharge of under-calcined trona ore. The steam and carbon dioxide evolved in reactor 18 is passed to waste a heat boiler (not shown) via line 21 where the bulk of the steam is condensed along with a small quantity of carrier liquid vaporized in reactor 18. Low pressure steam from the waste heat boiler can be utilized for heating purposes. Condensed steam is vented from reactor 18 via line 22 and conveyed to generator 23 via line 22 where the water is used to generate steam from introduction into reactor 18 via line 19 as described above.

The hot slurry of sodium carbonate and carrier liquid is conveyed to settler 24 via line 25 where the coarser particles of sodium carbonate settle out leaving behind a slurry of finer particles of sodium carbonate and liquid carrier. The coarser particles are conveyed directly to dissolver 26 via lines 27 and 30, by-passing interchanger 28. The hot slurry of fine particles and carrier liquid is conveyed to interchanger 28 via line 29 where the slurry is cooled and the cooled slurry is passed from interchanger 28 to dissolver 26 via line 30. Water or weak aqueous sodium carbonate solution is introduced into dissolver 26 via line 31. The mixture of water or aqueous solution, sodium bicarbonate particles and carrier liquid are maintained under vigorous agitation to promote intimate contact between all components of the mixture dissolving the sodium carbonate in the water or aqueous solution. The mixture of the aqueous sodium carbonate solution and carrier liquid is conveyed to decanter 32 via line 33 leaving behind any inert or water insoluble materials originally present in the mined trona ore. In decanter 32, the mixture is allowed to separate into an aqueous phase and water immiscible liquid carrier phase. In FIG. 1, the carrier liquid is indicated as being less dense than the aqueous sodium carbonate phrase, and thus forming the upper layer. A denser carrier liquid can be employed, in which case the liquid would form the lower layer in decanter 32. The aqueous sodium carbonate solution is withdrawn from decanter 32 via line 33 under the force of pump 34, and is processed to yield anhydrous sodium carbonate using conventional process technology. The carrier liquid is withdrawn from decanter 32 via line 35, and is conveyed to interchanger 28 where the liquid is warmed by heat transferred from the hot slurry introduced into interchanger 28 from settler 24 as described above, the liquid is thereafter conveyed to heater 36 where is heated to about 100° C., and thereafter to mixer 14 via line 37 for use as described above.

What is claimed is:

1. A calcination process for the preparation of sodium carbonate which comprises the steps of:
   (a) preparing a suspension of particles of sodium bicarbonate, sodium sesquicarbonate or a mixture thereof in one or more water-immiscible carrier liquids in which said sodium bicarbonate, sodium sesquicarbonate or said mixture is substantially insoluble; and
   (b) heating said suspension under atmospheric pressure for a time and at a temperature sufficient to promote conversion of all or a portion of the sodium bicarbonate, sodium sesquicarbonate, or mixture into sodium carbonate; and
   (c) separating said sodium carbonate from said water-immiscible carrier liquids.

2. A process according to claim 1 wherein said suspension contains sodium sesquicarbonate.

3. A process according to claim 1 wherein said one or more water-immiscible carrier liquids are selected form the group consisting of inorganic liquids.

4. A process according to claim 1 wherein said one or more water-immiscible carrier liquids are selected from the group consisting of organic liquids.

5. A process according to claim 1 wherein said one or more water-immiscible carrier liquids are selected from the group consisting of parafins, isoparafins, aromatic oils and polyaromatic oils.

6. A process according to claim 1 wherein said sodium bicarbonate average particle size is equal to or less than about 4 mesh.

7. A process according to claim 6 wherein said average particle size is equal to or less than about 10 mesh.

8. A process according to claim 7 wherein said average particle size is from about 10 to about 200 mesh.

9. A process according to claim 8 wherein said average particle size is from about 50 to about 100 mesh.

10. A process according to claim 1 wherein said suspension is heated to a temperature of from about 120° C. to about 300° C.

11. A process according to claim 10 wherein said suspension is heated to a temperature of from about 150° C. to about 200° C.

12. A process according to claim 1 wherein said heating step is conducted at a pressure of greater than about 15 psig.

13. A process according to claim 12 wherein said heating step is conducted at a pressure of from about 90 to about 100 psig.

14. A process according to claim 1 wherein said heating step is conducted at a pressure less than the pressure at which an aqueous phase can exist in equilibrium with gases generated during said heating step.

15. A process according to claim 1 wherein said heating step is carried out in an enclosed system.

16. A process according to claim 15 wherein said heating step is carried out by injecting steam into said suspension. pg,16

17. A process according to claim 16 which further comprises recovering energy from said system in the form of low pressure steam by heat exchange between water and carbon dioxide liberated during said heating step.

18. A process according to claim 1 wherein said sodium carbonate is separated from said immiscible liquids by dissolving said sodium carbonate in water and separating the aqueous phase from the water immiscible liquid phase.

19. A process according to claim 18 wherein said phases are separated by decantation.

* * * * *